Patented June 2, 1953

2,640,759

UNITED STATES PATENT OFFICE 2,640,759

PROCESS OF PRODUCING MAGNESIA

Vaughn V. Hughey, Tiffin, Ohio, assignor to Basic Refractories, Incorporated, Cleveland, Ohio, a corporation of Ohio No Drawing. Application September 22, 1949, Serial No. 117,269

10 Claims. (Cl. 23—201)

Customarily, in calcining in rotary kilns, granular or rather finely ground material is charged into a kiln to be encountered by the combustion gases and high temperature zone of the kiln, and the material is supplied in the form of heavy slurries or in some cases dry. Where the material is fed in a dry pulverulent condition there is a very high loss in the form of dust blown out by the combustion gases. In all cases where reaction is contemplated, as for instance between the ingredients of the charge, the degree of efficiency is controlled to a large extent by the extent of contact between the reactant materials. Correspondingly, other things being equal, the finer the state of division of the materials, the better the contact and the more complete the reaction. But, as seen, under customary conditions it has not been possible to attain a desired high efficiency in this respect, on account of the high dust losses in the case of rotary kilns. In accordance with the present invention it now becomes possible to apply very finely ground raw materials, and obtain burning action with free and thorough contact of the heating fuel gases, and with comparatively small dust losses. Other objects and advantages of the invention will appear from the following description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the priniciple of the invention may be employed.

In the operation of rotary kilns, it has been found that a kiln treating magnesite slurry to produce dead burned magnesia may have its production rate of throughput raised substantially, in instances as much as 50 per cent through application of the present invention. And again, the dust loss is materially reduced when the present procedure is used instead of the usual rotary kiln operation with dry finely ground feed. Moreover, by reason of the more intimate mixture of the materials, and the improved heat transfer rate, the fuel consumption is appreciably reduced, and products of greater uniformity are attainable than is customary in rotary kiln practice.

Raw materials applicable with the present process are, for instance, refractory materials such as brucite, magnesite, dolomite, also limestone as for special uses, and there may be included what are concisely designated as "burning agents," these, as known in the refractory art, being iron oxide in the form of iron ore or mill scale, chrome ore, borax or natural boron compounds, soda ash, sodium silicate, silica, serpentine, etc. The action of such burning agent, as well known in the refractory art, being to facilitate crystallization of periclase, lime and other refractory compounds and generally facilitate the shrinkage and maturing of the calcined product, the connection is manifestly clear.

The raw materials are ground finely. In some cases wet grinding is more especially advantageous, and in some instances dry grinding is desirable. In any case, the material is desirably reduced to a fineness of about minus 100 mesh U. S. series, and the moisture content is ultimately controlled to a close range. The degree of fineness just stated is generally preferable, although in some instances there may be a variation from materials essentially passing 35 mesh to materials essentially passing 200 mesh. In general, the finer the material, the more satisfactory the resultant product. Thus, with fine grinding of the initial materials, and the conditioning to the preferred moisture content, the mass is then compressed under high pressure into the form of small bodies. The size may vary, for instance, up to an overall maximum dimension of an inch-and-a-half, but smaller sizes are preferable as affording a satisfactory heat transfer while permitting contact of combustion gases. In the instance of rotary kiln feeds, it is preferable to limit at least one dimension to a maximum of ¾ inches, so as to insure adequate heat treatment during a limited retention period. Ovoid pellets of dimension about 1⅛" x ¾" x ⅝"' are generally satisfactory, for example.

High pressure is desirable in the molding of such bodies, and pressures of 10,000 to 20,000 p. s. i. are in the practical range, although this may be departed from, lower and higher. The particular material involved will to some extent determine the most desirable pressure to be employed.

To facilitate pressing and to obviate intermediate drying, it is advantageous to include in the feed mixture ahead of the presses a substantial amount of a hydratable alkaline earth oxide, as active magnesium oxide or calcium oxide or mixtures of these. These may be conveniently supplied in the form of caustic magnesia as for instance, calcined brucite, calcined magnesite, calcined magnesium hydroxide, and calcined magnesium carbonate, and in the form of lime as for instance, calcined dolomite, calcined limestone, and calcined calcium carbonate.

In general, for satisfactory molding of the finely ground material, a free moisture content of 3-6 per cent at the time of pressing is desirable. This may be obtained by control of the water content or its adjustment as necessary at the time of molding. Where the mixture includes substantial amounts of active magnesium oxide or calcium oxide, free water in the range aforenoted is generally sufficient for adequate bonding results. In some cases, in addition to the water content there may be provided some binder, as magnesium chloride, magnesium sulphate, calcium chloride, lignin from paper pulp manufacture residues, molasses, starch, dextrin, etc. Thus, for example, in the treatment of brucite for refractory preparation, illustrative amounts of moisture in the form of added water are as follows:

1. 106 parts[1] brucite, 5 parts mill scale, 5 parts serpentine, 26 parts calcined dolomite and 11 parts water.
2. 75 parts brucite, 5 parts mill scale, 5 parts serpentine, 26 parts calcined dolomite, 20 parts calcined magnesite and 18 parts water.
3. 75 parts brucite, 25 parts active magnesium oxide and 10 parts water.
4. 100 parts magnesite, 25 parts active calcined magnesite, and 10 parts water.
5. 54 parts dolomite, 4 parts mill scale, 9 parts serpentine, 56 parts calcined magnesite, and 22 parts water.

Where using a burning agent, the amount conforms with known art and may desirably be in the range of 0.05-12 per cent, it being understood that such very active flux-type agents as the boron compounds and soda compounds are used in the smallest amount, even desirably under 1 per cent.

A particular refinement of the invention involves controlling the moisture content, and the bonding, by proportioning between raw or unburned magnesia-providing material, and calcined magnesia-providing material. And thus, the raw material can be wet-ground to advantage, and excess water be then removed by de-watering, and the calcined component can be dry-ground and, on mixture of the two components, the resultant blend is of a moisture content range ready for the molding operation. By control of the moisture content, the molded bodies or pellets formed can be safely fed directly to the kiln without hazard of bursting from internal steam pressure developed. Where desired, however, excess moisture may be carried into the molded product and a stage of drying may intervene before feeding to the kiln. Generally, it is preferable to closely control the moisture content in the first instance, as thereby an added cost of drying is eliminated. In some instances the pellets, after being formed and ready for burning, may be crushed and sized and in such condition be fed to the kiln.

As indicated, the operation may be carried out with a rotary type kiln. Kiln temperatures may vary and will in general approach those now prevailing, depending upon the particular material treated and the product desired. For magnesia refractories, temperatures generally of the order of 2900° to 3300° F. are desirable. With a given heat treatment, the present invention in general gives a more fully matured product than is commonly obtained using a pulverulent feed.

Illustrative examples showing various feeds and methods of preparation are as follows:

1. Crushed brucite, serpentine and mill scale in the respective proportions of 75, 5 and 5 parts by weight were ground with water in a ball mill to essentially —100 mesh, U. S. series, to yield a slurry containing 60% solids. This slurry was dewatered on a rotary vacuum filter to give a filter cake containing 80% solids. In the meantime, 26 and 20 parts by weight of calcined dolomite and calcined magnesite, respectively, were ground in an impact mill to essentially —100 mesh. The moist filter cake and dry-ground calcines were then mixed in a dry-pan mixer for 5 minutes. The resultant blend was pressed in a double-roll briquetting press to form ovoid pellets, 1⅛" x ¾" x ⅝". The pellets were then charged into a rotary kiln and fired at approximately 3000° F. to give a fully-burned matured product of uniform composition.

2. Brucite, serpentine, mill scale and calcined dolomite were dry-ground in the respective proportions of 106, 5, 5 and 26 parts by weight in an air-swept ball mill to essentially —100 mesh, U. S. series. The small amount of moisture in the brucite, serpentine and mill scale did not need to be removed by drying as it was picked up by the calcined dolomite to form calcium and magnesium hydroxides. The ground mix was transferred to a mixer and blended with 6 parts by weight of hot water. The resulting blend was pressed in a double-roll press into small bodies having one dimension of ⅝". The briquettes were then charged into a rotary kiln fired at 2900° F. to give a fully-burned product of uniform composition.

3. Crushed brucite, and hematite iron ore in the respective proportions of 80 and 6 parts by weight were ground with water in a ball mill to essentially —100 mesh to yield a slurry containing 60% solids. This slurry was dewatered on a rotary vacuum filter to yield a filter cake containing 80% solids. In the meantime, 46 parts of active magnesium oxide were ground in a roller mill to essentially —100 mesh. The wet filter cake and the dry oxide were blended and heated to 180° F. in a suitable mixer, either continuous or batch-type, for about 5 minutes and pressed immediately in a double-roll briquetting press into almond-shaped briquettes, 1⅛" x ¾" x ⅝". These briquettes were charged into a rotary kiln fired at 3050° F. to give a uniform well matured product.

4. Dolomite and mill scale in the respective proportions of 140.0 parts and 4.0 parts by weight were ground with water in a ball mill to essentially —100 mesh to produce a slurry containing 70% solids. This slurry was dewatered on a rotary vacuum filter to a cake containing 90% solids. In the meantime, 30.0 parts by weight of calcined dolomite were ground in a roller mill to essentially —100 mesh. The moist filter cake and the dry calcine were blended into a homogeneous mass and pressed in a double-roll briquetting press to form small masses, 1⅛" x ¾" x ⅝". The free moisture content of the blend was about 3 to 5% at the time of pressing. The briquettes, after a short aging period (30 minutes), were charged into a rotary kiln at 3100° F. and burned to produce a dead burned, dense, uniform refractory product.

5. Dried, crushed brucite, mill scale, serpentine in the respective ratios of 105.8, 5.1 and 5.4 parts ---
[1] By weight.

by weight were ground in a ball mill with 26 parts of calcined dolomite to essentially —100 mesh. The dry-ground material was blended with 10.4 parts by weight of water and the resulting tempered material briquetted in a double-roll briquetting press into almond-shaped briquettes, 1⅛″ x ¾″ x ⅝″. The briquettes were charged into a rotary kiln at 2900° F. to yield a fully calcined dense refractory product of uniform composition.

6. Crushed calcined magnesite and mill scale in the respective proportions of 200 and 4 parts by weight were ground dry in a ball mill to essentially minus 100 mesh, U. S. series. The dry-ground material was mixed with 80 parts by weight of hot water containing 2 parts by weight of $MgCl_2 \cdot 6H_2O$ in a dry pan mixer. The mixing was continued until approximately 90% of the water had chemically combined with the dry materials, and then while still hot the tempered mixture was pressed in a double-roll press into ovoid pellets, 1⅛″ x ¾″ x ⅝″. The pellets were predried at approximately 250° F. and charged into a rotary kiln and fired at approximately 3200° F. to give a fully burned product of uniform composition.

7. Crushed magnesite, mill scale and actively calcined magnesium oxide in the respective proportions of 150, 7 and 25 parts by weight were ground in a dry ball mill to essentially minus 100 mesh, U. S. series. The dry material was blended with 10 parts by weight of hot water (200° F.) in a suitable mixer for about 5 minutes and pressed immediately in a double-roll briquetting press into almond-shaped briquettes, 1⅛″ x ¾″ x ⅝″. These briquettes were charged into a rotary kiln and fired at about 3100° F. to form a hard-burned, dense clinker.

With the various materials applicable in the process, the combination of the fine grinding, the conditioning to the proper moisture content, the high pressure compressing of the material into small bodies, and the firing of these in exposure to the combustion gases, gives a particularly complete reaction between components thus brought into such intimate contact by pressure. Through the complete and rapid reaction, the kiln throughput is greatly accelerated and the fuel requirements are lowered, while the final product is notably of more uniform character than attainable in customary procedures. After the calcining, the product can of course be crushed and ground if desired, and be sieved to whatever sizes are preferred.

Other modes of applying the principle of the invention may be employed, change being made as regards the details described, provided the features stated in any of the following claims or the equivalent of such be employed.

I therefore particularly point out and distinctly claim as my invention:

1. In a process of producing magnesia, comprising the following steps: mixing un-burned magnesia-providing material selected from the class consisting of magnesite, brucite, dolomite, precipitated magnesium hydroxide and precipitated magnesium carbonate with a minor portion of hydratable alkaline earth oxide of the group consisting of magnesium oxide and calcium oxide, the particle size of the mixture not exceeding 35 mesh, providing a moisture content of 3-6 per cent, compressing the mixture into small bodies with rounded surfaces, and dead burning the same at a temperature of 2900-3300° F. in a rotary kiln whereby dust and loss in such rotary firing is eliminated.

2. A process according to claim 1, wherein magnesite is the un-burned magnesia-providing material.

3. A process according to claim 1, wherein brucite is the un-burned magnesia-providing material.

4. A process according to claim 1, wherein precipitated hydroxide of magnesium is the un-burned magnesia-providing material.

5. A process according to claim 1, wherein dolomite is the un-burned magnesia-providing material.

6. In a process of preparing magnesia, the steps which comprise: mixing un-burned magnesia-providing material selected from the class consisting of magnesite, brucite, dolomite, precipitated magnesium hydroxide and precipitated magnesium carbonate with a minor portion of hydratable alkaline earth oxide of the group consisting of magnesium oxide and calcium oxide in such an amount so as to reduce the total moisture to 3-6 per cent, the particle size not exceeding 35 mesh, compressing the mixture into small bodies with rounded surfaces, and then dead burning the same at a temperature of 2900-3300° F. whereby dust and loss in rotary kiln firing is eliminated.

7. A process according to claim 6, wherein magnesite is the un-burned magnesia-providing material.

8. A process according to claim 6, wherein brucite is the un-burned magnesia-providing material.

9. A process according to claim 6, wherein precipitated hydroxide of magnesium is the un-burned magnesia-providing material.

10. A process according to claim 6, wherein dolomite is the un-burned magnesia-providing material.

VAUGHN V. HUGHEY.

References Cited in the file of this patent

UNITED STATES PATENTS

| Number | Name | Date |
|---|---|---|
| 2,281,477 | Chesny | Apr. 28, 1942 |
| 2,348,847 | Pike | May 16, 1944 |
| 2,443,424 | Heuer | June 15, 1948 |
| 2,447,412 | Heuer | Aug. 17, 1948 |
| 2,537,012 | Austin et al. | Jan. 9, 1951 |
| 2,537,013 | Austin et al. | Jan. 9, 1951 |

FOREIGN PATENTS

| Number | Country | Date |
|---|---|---|
| 433,253 | Great Britain | Aug. 12, 1935 |
| 583,009 | Great Britain | Dec. 4, 1946 |
| 489,695 | Germany | 1930 |